United States Patent [19]
Hully

[11] 3,935,650
[45] Feb. 3, 1976

[54] SCHOLASTIC TEST AND GRADING APPARATUS

[76] Inventor: Donald R. Hully, 1404 E. Stop 11 Road, Indianapolis, Ind. 46227

[22] Filed: July 31, 1974

[21] Appl. No.: 493,318

[52] U.S. Cl. ................................. 35/48 B; 35/9 B
[51] Int. Cl.² ........................................ G09B 5/00
[58] Field of Search........... 35/48 R, 48 B, 9 R, 9 B, 35/9 D

[56] References Cited
UNITED STATES PATENTS

| | | | |
|---|---|---|---|
| 3,209,471 | 10/1965 | Brittan | 35/48 B |
| 3,407,516 | 10/1968 | Blaske, Jr. | 35/48 B |
| 3,631,611 | 1/1972 | Abell | 35/48 B |

*Primary Examiner*—John H. Wolff
*Attorney, Agent, or Firm*—Jenkins, Hanley & Coffey

[57] ABSTRACT

Scholastic test grading apparatus uses a circular answer sheet having a circular series of angularly-spaced, numbered rows of radially-spaced answer spaces on which the student marks his answers to correspondingly numbered questions by blacking-in selected ones of the answer spaces as with soft pencil lead. The sheet also carries punch locating indicia opposite each number. The answer sheet is graded by pressing it, in a selected orientation, against a printed circuit board which has formed thereon a pattern of electrical gaps corresponding to the correct-answer positions on the answer sheet. The blacked-in pencil lead blacking material in such positions bridges the electrical gaps to close electrical circuits to a circle of lamps, which light up to show both how many and which answers are correct. A question label disk placed in the circle of lamps identifies the questions or groups of questions indicated by the several lamps.

The circular shape and arrangement of the answer sheet permits it to be oriented in numerous angular positions against the printed circuit board, so as to give different correct answer locations for different tests without changing the pattern of gaps on the circuit board. A designated orientation for each test is obtained by punching holes at selected pairs of the punch locating indicia and engaging the holes over fixed locating pins.

The grading apparatus supports the printed circuit board over a pressure pad which may be manually retracted and latched downward to define a slot for insertion of the answer sheet and which, when released, is spring-pressed upward to press the sheet against the circuit board. The circuit board is a plug-in unit which is readily replaceable to change correct-answer patterns.

The electrical answer-indicating circuits each contain a lamp and a resistance, and operates at relatively high voltage, e.g. 100 v., so as to ensure reliable circuit closure by the blacking material in the answer spaces, and such circuits are isolated from line voltage by an isolating transformer.

26 Claims, 9 Drawing Figures

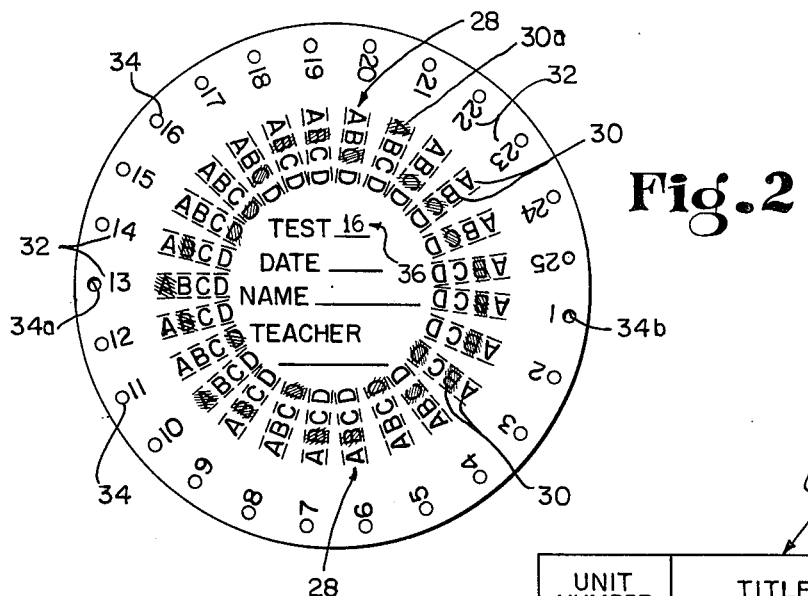
Fig. 2
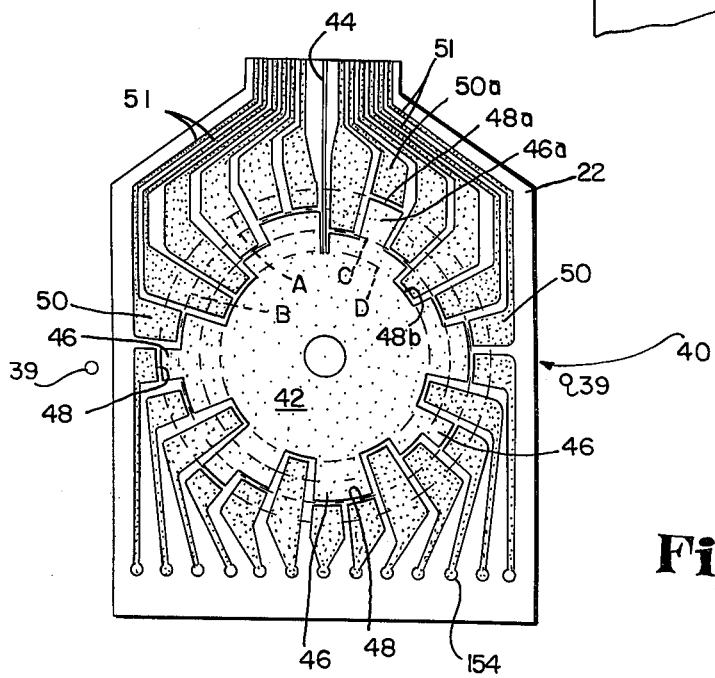
Fig. 3
Fig. 4

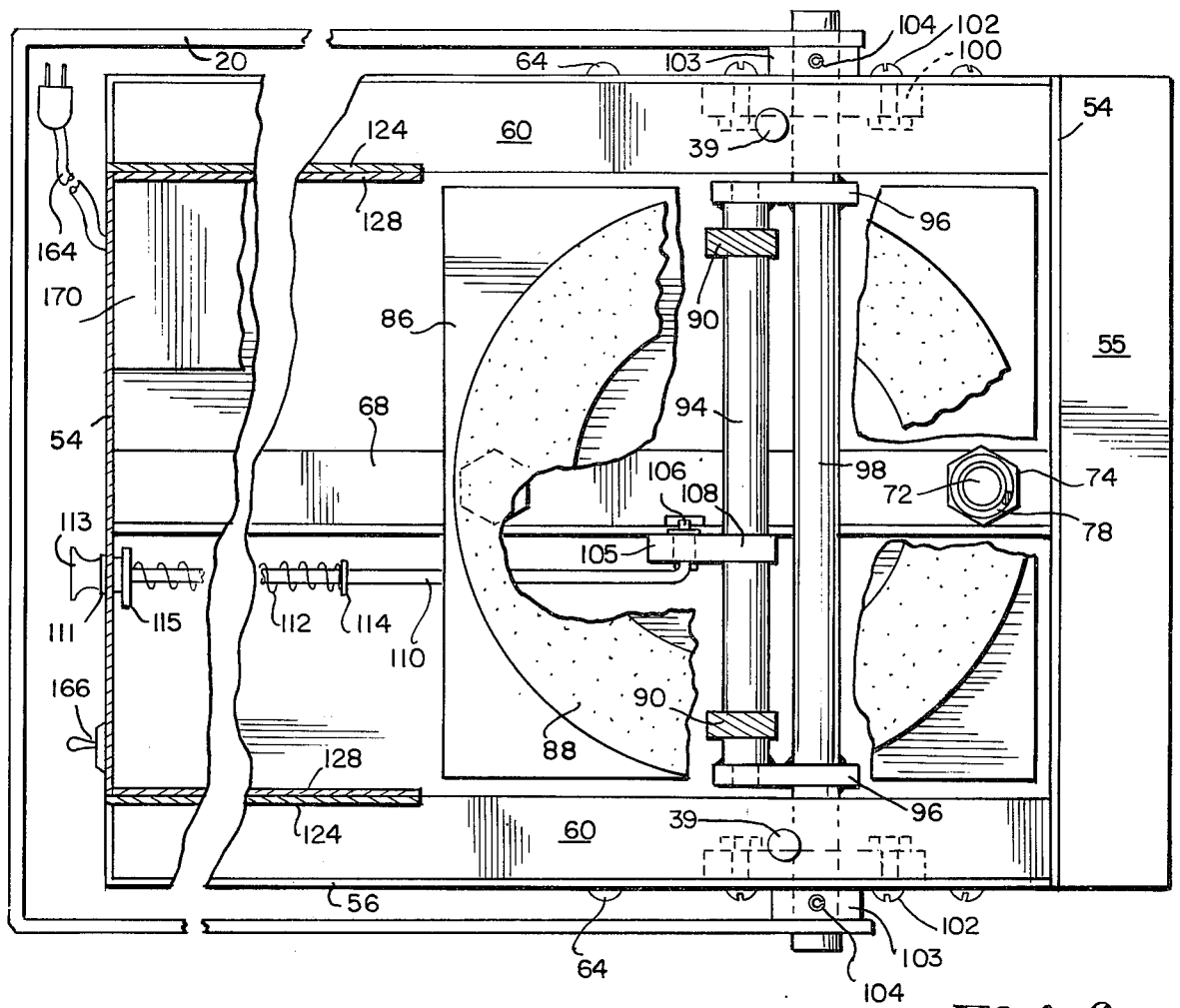
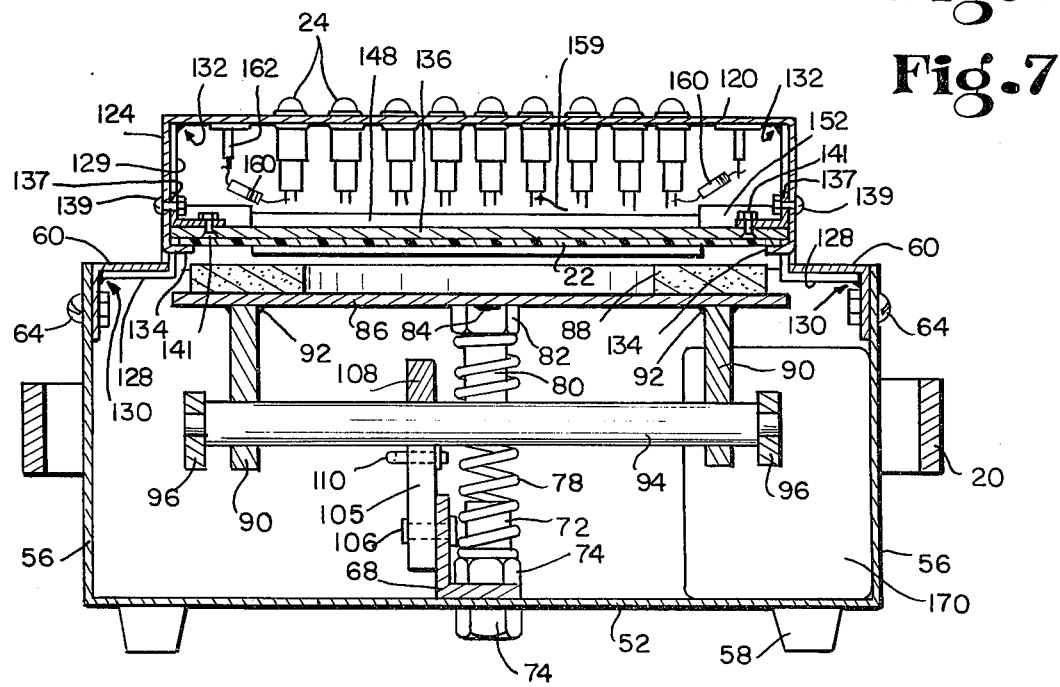
Fig.6
Fig.7

SCHOLASTIC TEST AND GRADING APPARATUS

BACKGROUND OF THE INVENTION

This invention relates to scholastic test grading apparatus, and especially to apparatus for quickly and easily evaluating answers to different scholastic examination units without adjustment of the machine answer code.

Automatic test grading machines have recently become popular for grading many types of student examinations. These are especially useful in scoring examinations wherein multiple-choice or true/false answers are indicated upon standardized answer sheets. Prior grading machines comprise fairly complicated and expensive electrical and mechanical apparatus which compare student responses with an answer code and provide a performance readout such as a number indicating how many questions were correctly answered.

In modern education, students are frequently encouraged to proceed through sequential courses of study at an individually-set pace, and to test themselves on each subject unit as soon as they feel they have mastered the material of that unit. In such practice, it is desirable to provide test and grading apparatus which will accommodate many students completing different examinations simultaneously, and to provide inexpensive and easy to operate grading apparatus which will score different examinations with little or no machine adjustment from one examination to another.

In the prior art, U.S. Pat. No. 3,407,516 proposes a test grading system which utilizes answer cards on which the student indicates his responses to test questions by punching holes at selected locations. The punched answer card is then graded by superimposing it on a test code card which has perforations therein arranged according to the correct responses to the test questions, and both cards are inserted into a machine for scoring. In the machine, a series of contact fingers sense matching holes and register one count whenever the perforations in the two cards coincide. Such machines do not indicate to the student which questions were answered correctly and which were not, and this is especially disadvantageous for grading self-administered, progress tests used in sequential study courses. Moreover, the machine requires a separate answer code card for each different examination, and one of these cards must be inserted into the machine each time an answer card is inserted, which makes a machine of this type both complicated and time consuming to use.

Other grading machines have been proposed which provide a plurality of self-contained answer codes. These machines may use a standardized answer card on which the student indicates his responses to test questions by blacking-in selected ones of a series of blocks with pencil lead. In U.S. Pat. No. 3,631,611, for example, such an answer card is graded by bringing it into contact with a series of spaced contact fingers which are electrically connected according to a preset answer code. Each correctly located answer marking on the card completes a circuit through a pair of the fingers to energize a counter for registering the total number of correct answers, and to energize a marking device which marks the correct answers. While machines of this type do not require answer codes to be maintained apart from the machine itself, they do require the machine to be provided with marking means and means to change the answer code, and require changing the answer code whenever a card from a different examination is to be graded. Such provisions make the machine complicated and expensive, and its use is particularly time consuming and undesirable when students are following modern, individualized programs of study and are thus completing many different examinations at the same time.

The present invention provides an inexpensive grading apparatus which is easy to use, which tells the student not only how many but which answers are correct and incorrect, and which permits different tests to be scored in different ways without machine adjustment.

SUMMARY OF THE INVENTION

Test and grading apparatus in accordance with the invention comprises a circular answer sheet which carries a series of angularly-spaced rows of radially-spaced answer spaces, on which a student may indicate his answers to a corresponding series of multiple-choice or true/false questions by blacking-in a selected answer space in each row with a soft lead pencil. Desirably, the rows of answer spaces are numbered to correspond to the questions, and the answer spaces of each row may be identified by letters. The answer sheet also carries a circumferential series of orientation code indicia, which are desirably a series of punch locations respectively adjacent the several row numbers.

Apparatus for grading or scoring the answer sheets comprises a sensing panel which carries electrical contact elements that form a series of angularly-spaced electrical gaps in a predetermined pattern at radially-spaced positions corresponding to the correct-answer positions in the rows of answer spaces on the answer sheet. The relationship is such that when a completed answer sheet is pressed against the sensing panel in a proper orientation, the correctly blacked-in answer spaces will overlie the electrical gaps and the blacking material therein will bridge the gaps and close electrical circuits to a circle of lamps which indicate how many and which correct answers have been given. A question label disk placed in the circle of lamps identifies the questions or groups of questions indicated by the several lamps.

Because of the circular shape of the answer sheet and the circular arrangement of the answer-space rows and the pattern of electrical gaps, the answer sheet may be pressed against the sensing panel in any of numerous angular orientations. Such different orientations have the effect of producing different positions of correct answers on the answer sheet, and permit different correct-answer positions to be used on a number of different tests without changing the pattern or code of the electrical gaps on the sensing panel. Selected different orientations of the answer sheet relative to the sensing panel, for different tests, are obtained by aligning selected orientation indicia on the answer sheet with predetermined locating points relative to the sensing panel. Preferably, this is done by providing a pair of locating pins in fixed positions relative to the sensing panel, and orienting the answer sheet thereon by means of a pair of holes which are punched in the answer sheet at punch locations selected to match the test being answered. Such holes are desirably punched after the student has completed the answer sheet so that he previously has no way of knowing which orientation will be used in grading his answer sheet on the particular test being taken.

In accordance with the invention, the preferred apparatus for grading the answer sheets comprises a housing which defines a narrow, preferably horizontal, slot to receive an answer sheet, and is provided with a pair of locating pins for locating and orienting the sheet in the slot. The sensing panel is mounted above the slot and desirably is in the form of a printed circuit board on which the electrical gaps have been formed in a predetermined pattern. A pressure plate is mounted below the sensing panel, is spring pressed upward to press the answer sheet against the sensing panel, and is connected to a manually operated lever which retracts it to permit insertion of the answer sheet in the slot. The printed circuit board is desirably a plug-in unit which is readily replaceable to change correct-answer patterns.

The electrical answer-indicating circuits of the apparatus desirably operate at relatively high voltage, for example, at 110 volts, so as to ensure reliable circuit closings by the blacking material in the answer spaces. The circuits each desirably contain a high resistance in series with the indictor lamp, to permit use of glow lamps of high reliability and long life. The operating circuits are desirably isolated from line voltage by an isolating transformer.

BRIEF DESCRIPTION OF THE DRAWINGS

The accompanying drawings illustrate the invention, and show a preferred and exemplifying embodiment. In such drawings:

FIG. 2 is a plan view of an answer sheet for use with the grading machine shown in FIG. 1, with certain answer spaces shaded to represent answer markings;

FIG. 3 shows a portion of a test code sheet for use with the grading machine shown in FIG. 1;

FIG. 4 is a plan view of an electrically conductive laminate pattern on the underside of the circuit board, as seen from above the circuit board for superimposition on the answer sheet shown in FIG. 2;

FIG. 6 is a fragmented horizontal section of the machine taken on the line 6—6 of FIG. 5, with portions thereof broken away;

FIG. 7 is a transverse vertical section of the machine taken on the line 7—7 of FIG. 5;

DETAILED DESCRIPTION OF THE PREFERRED EMBODIMENT

Figure 1:
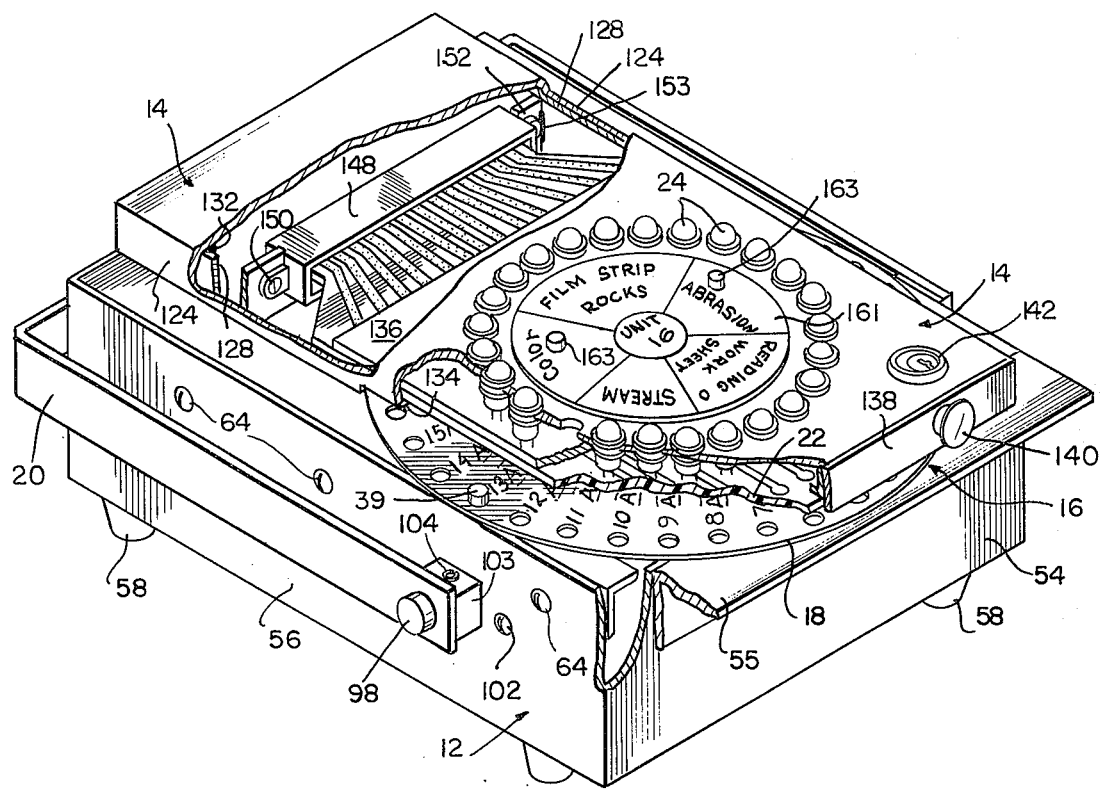
FIG. 1 is an isometric view of a test grading machine of this invention, with portions thereof broken away.

Test grading apparatus embodying the invention is shown in FIG. 1 and generally comprises a grading machine 10 having a lower housing 12 with an upper sensing panel 14 mounted thereon in a manner to provide a forwardly open slot 16 for reception of a circular test answer sheet 18. The top face of the slot 16 is defined by a sensing panel, here shown as a circuit board 22 which has sensing means on its bottom side for sensing correctly-marked answers on the answer sheet 18 and for forming circuits to energize lamps 24 mounted in a circle in the top of the panel 14 to indicate the correct answers. The lower housing 12 contains a pressure plate for pressing the answer sheet against the circuit board 22, and such plate is controlled by a manually operated control arm 20.

A test answer sheet 18 for use with the grading machine 10 is shown in FIG. 2, and comprises a circular paper sheet of a convenient thickness provided with a central area for student and test identification data. The circular portion of the sheet surrounding such central area is printed to provide a series of angularly-spaced rows 28 of radially-spaced answer spaces 30. The rows 28 are numbered with printed numbers 32 to correspond to numbered test questions, and the answer spaces 30 are identified by the letters A, B, C, and D, to correspond to similarly identified possible responses to the test questions. The test questions will normally be either multiple-choice or true/false questions to which answers can be indicated by marking one or more of the answer spaces 30. The particular number of answer rows as well as the number of answer spaces within each row may vary, but in practice, it has been found that an answer sheet having a diameter of about eight inches readily accommodates 25 answer rows having four answer spaces each.

In using the answer sheet 18, a student indicates his response to each test question by blacking-in with a soft lead pencil a selected one of the answer space A, B, C, or D of the row corresponding to the question. Such blacked-in spaces are shown by shading on the answer sheet in FIG. 2.

The answer sheet 18 also carries a circular series of orientation indicia, here shown as a ring of round punch markings 34 printed about the periphery thereof and respectively adjacent the numbers 32 of the rows 28. Such markings 34 are used to fix the orientation of the answer sheet 18 in the grading machine. To this end, after completion of the test by a student, a pair of apertures are punched in the sheet at two selected and generally opposite markings 34a and 34b, in accordance with a predetermined code for the test being graded. The test unit is identified by a number recorded in the identification area at the center of the sheet, as at 36 in FIG. 2. The punching code is desirably recorded on a master code sheet 38, such as that shown in FIG. 3, and this indicates which pair of the markings 34 are to be punched for each different test unit. For example, FIG. 3 shows that for test unit number 16, the orientation apertures are to be punched through the orientation code markings 34 adjacent the answer rows numbered 1 and 13, and such punchings are shown in FIG. 2.

The answer sheet 18 is scored by inserting it into the forwardly open slot 16 of the grading machine 10 with its printed and pencil-marked face upward, as shown in FIG. 1. The sheet is located and angularly oriented within the slot by positioning the apertures punched therein over a pair of locating pins 39 mounted on the machine 10 at opposite sides of the sensing panel 14. After the answer sheet 18 is properly located and oriented in the slot, the sheet is pressed into contact with the sensing means on the underside of the circuit board 22 for scoring, as will be described below. In the apparatus shown, there are 25 possible angular orientations of the answer sheet 18 within the slot, equal to the number of answer rows 28 printed thereon. A corresponding number of different sets of answer positions on the answer sheets will be available for use with different tests or test units, and the different angular orientations to be used for the different test units will be shown by the master code sheet 38.

The sensing means on the underside of the circuit board 22 comprises a copper laminate gap pattern which can be photographically etched on the board in a conventional manner. One such gap pattern 40 is shown by way of example in FIG. 4, and for convenience, said pattern 40 is shown as viewed from above the circuit board for superimposition over the answer sheet 18 shown in FIG. 2. Such gap pattern has a central common contact area 42 connected to a lead 44. At angularly spaced positions about its periphery, such central contact area has edge portions or arms 46 which extend outward to one or another of four circles A, B, C, and D, shown in dotted lines, and there lie in spaced relation with individual contact areas 50 so as to form narrow gaps 48 on and along such circles. The circles have radii equal to the distance from the center of the answer sheet to the answer spaces A, B, C, and D thereon. The gaps 48 are thus radially-spaced in the same positions as the answer spaces, and they are also angularly spaced to register with the rows 28 of answer spaces. The position of the gap 48 along each row 28 of answer spaces determines which space will represent the correct answer to the question corresponding to that row. The relationship of the gaps to the circles, i.e., as to which circles the gaps overlie, is a random relationship, so that there will be no regular pattern of correct-answer positions which students can discern.

Each individual contact area 50 is connected to an electrical lead which is connected in circuit with one of the indicator lamps 24, as will be more fully discussed below. When the gap 48 in a circuit is bridged by a blacked-in pencil marking on the answer sheet, this completes an electrical path between the contact areas 46 and 50 and completes the circuit and lights the lamp. The lamps of the several circuits are arranged in a circle in the same circumferential order as the gaps 48 on the board and hence in the same order as the corresponding answer-space rows 28 on the answer sheet, and the series of lights thus has a predetermined relation to the series of answers on the answer sheet, which relation depends, however, on the orientation of the answer sheet relative to the circuit board.

When the answer sheet 18 is pressed into contact with the printed circuit 40 on the circuit board, the rows 28 of answer spaces respectively lie radially across the several gaps 48 of the printed circuit. If a question for each row has been correctly answered, the blacked-in answer space representing the correct answer will be radially positioned on the gap so as to bridge the gap in that angular position and complete the electrical path between the center contact area 46 and the individual contact area at that position. This will light the lamp in circuit with that gap and give a visual indication of the correct response. For example, referring to FIGS. 2 and 4, the student response for question No. 21 is indicated on the sheet shown in FIG. 2 by the pencil-blackened area A at the outermost answer space 30a of the 21st row of spaces. For test unit number 16, the gap representing the correct answer to question No. 21 is the correspondingly located gap 48a which lies on the outermost circle A in FIG. 4. Accordingly, when the sheet is brought into contact with the laminate pattern, the row 21, space A response bridges the gap 48a and completes the electrical path between the contact areas 46a and 50a to light the lamp 24 corresponding to question No. 21. Similarly, the student response to question No. 23 is shown by the blacked-in C answer space in row 23 on the answer sheet. However, the gap 48b corresponding to a correct answer to question NO. 23 is at the innermost or D position, and the C response is not properly located to bridge the gap 48b, and accordingly, the lamp 24 corresponding to question No. 23 will not light but will remain dark to indicate an incorrect answer.

The random radial arrangement of the gaps 48 on the laminate pattern 40 thus defines an answer code sequence, while the angular orientation of the answer sheet within the slot and with respect to the laminate pattern 40 determines the specific answer code for a particular examination unit. The number of possible specific answer codes is determined by the number of orientation positions which the answer sheet can have, and this is determined by the number of answer rows 28 on the sheet 18 and the corresponding number of angularly spaced gaps in the pattern. The specific answer code is changed simply by orienting the answer sheet in a different orientation with respect to the series of gaps 48. No internal machine adjustment is required, and different orientations for different tests are obtained by punching different parts of locating holes in the answer sheet, in accordance with a code guide as shown in FIG. 3, as the sheet is prepared for insertion in the grading machine.

The grading machine 10 shown in FIGS. 1 and 5–7 has a lower housing 12 and an upper sensing panel 14 mounted as a cantilever on the lower housing 12. The lower housing is a generally rectangular box having a horizontal bottom wall 52 and vertical end and side walls 54 and 56. It desirably has rubber mounting feet 58 at its corners. The top of the housing is provided with flat horizontal border portions to define the lower face of the slot 16 and to support the edges of the answer sheet 18 inserted therein. To provide such border portions, an angle member is bolted to the front end wall 54 by bolts 57 and provides a forward-extending lip 55. At the sides, the border portions are provided by the top flange of a pair of angle iron side-rails 60 which are bolted against the inner faces of the side walls 56 and run longitudinally the full length of the housing 12. Such side rails 60 also serve as a support for the cantilever upper panel, as will be described. The answer sheet locating pins 39 are mounted on the horizontal legs of the side rails 60 and extend upward therefrom in locations at opposite sides of the machine and outward from the sides of the sensing panel 14.

The pressure plate for pressing the answer sheet 18 upward into contact with the underside of the circuit board 22 is mounted within the lower housing 12. Such pressure plate comprises a rectangular platform 86 carrying a resilient pressure pad 88 of rubber or the like on its upper surface, and lies between the side rails 60.

The pressure pad 88 is desirably annular in shape and of a size to bear against that portion of an answer sheet which lies against the area of the circuit board which carries the electrical gaps 48, so as to concentrate the pressure of the pressure plate on the portions of the answer sheet which carry the answer markings and which engage the electrical gaps on the circuit board. The mounting mechanism for the pressure plate comprises a supporting beam of angle stock 68 extending longitudinally along the center of the housing bottom wall 52 for substantially the entire length of the machine. Such angle stock has a horizontal leg mounted against the bottom wall 52 by a pair of spaced bolts 72, held by nuts 74 and extending upward therefrom. The upper ends of the bolts 72 serve as locating posts for a pair of vertically extended springs 78. The upper ends of the springs 78 are received over bolts 80 mounted in nuts 82 welded to the underside of the platform 86 of the pressure plate. The springs normally tend to press the pressure plate upward against the circuit board 22.

To control the position of the platform 86, a pair of laterally spaced, downward extending posts 90 are connected as by welds 92 to the underside of the platform. The supports 90 are pivoted at their lower ends to a transverse crank bar 94 which is rigidly connected by a pair of crank arms 96 to a transverse control shaft 98. As shown, the bar 94 is disposed to the rear of the shaft 98 and parallel therewith. The control shaft 98 is mounted in bearings 100 formed from nylon or the like and fastened by bolts 102 to the side walls 56 of the housing. The shaft ends extend laterally outward from the bearings through the housing side walls, and are fixed by pins 104 to the ends of the U-shaped control arm 20. Collars 103 are welded to the control arm 20 and bear against the side walls 56 to prevent axial displacement of the shaft 98. From the ends of the shaft 98, the side legs of the control arm 20 extend rearward along the housing side walls, and the transverse leg of such arm forms a handle behind the rear wall of the housing.

Figure 5:
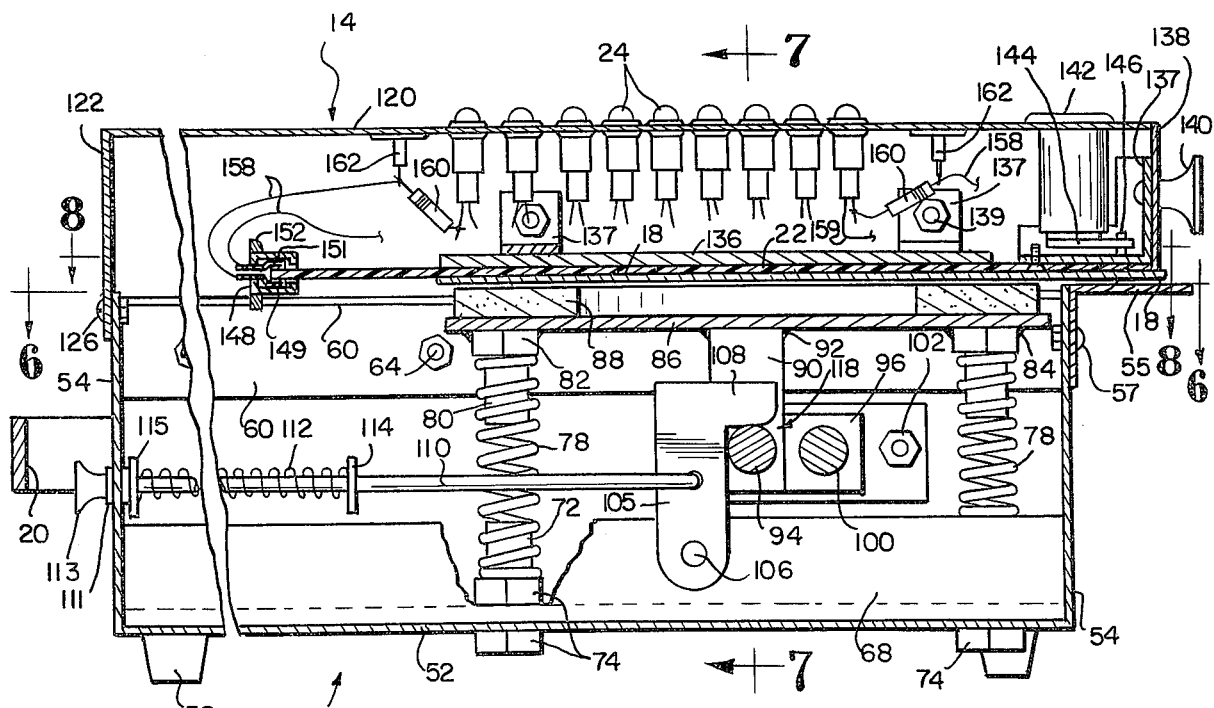
FIG. 5 is a longitudinal vertical section of the test grading machine shown in FIG. 1.

The platform is releasably retained in a lowered position away from the circuit board 22 by a latch 105. Said latch is pivotally mounted by a pin 106 to the vertical leg of the angle stock 68 at the bottom of the housing, and extends upward beneath the center of the platform behind and adjacent to the crank bar 94. The latch has a forward projecting finger 108 at the top thereof which is received over the crank bar when the platform is in a lowered position, as shown in FIG. 5, to releasably lock the platform away from the circuit board.

The latch 105 is controlled by an actuating rod 110 which has one end pivotally connected to the latch 105 at a point between the latch pin 106 and the latch finger 108. The rod 110 extends rearward through a bushing 111 mounted in the rear end wall 54 of the housing, and carries a handle 113 at its rearward end. A spring 112 surrounding the rear portion of the rod 110 bears against a fixed plate 115 adjacent the rear wall and engages a flange 114 fixed to the rod to urge the rod forward toward latched position.

The pressure plate 86–88 is normally held in lowered position by the engagement of the latch 105 with the crank bar 94, against the action of the springs urging the plate upward toward the circuit board 22. When the grading machine is to be used to grade an answer sheet, such sheet 18 is inserted in the slot between the pressure plate and the circuit board, the handle of the control arm 20 is slightly depressed to release the pressure of the crank bar on the latch 105, the handle 113 is then pulled out to move the latch to release position, and the control arm 20 is then allowed to swing upward, preferably at a manually limited rate. This allows the pressure plate to move upward under the influence of the springs 78, and when the control arm is fully released, the pressure plate presses the answer sheet against the circuit board with full pressure determined by the force of the springs. When the grading is completed, the handle of the control arm 20 is pressed downward to lower the pressure plate, and the latch 105 then automatically engages the crank bar 94 to hold the pressure plate in lowered position as shown in FIG. 5. The forward lower surface of the finger 108 may be rounded, as at 118, to facilitate such engagement.

The upper sensing panel 14 mounted on the lower housing 12 comprises a horizontal top wall 120, a rear end wall 122, and two side walls 124. The width of the panel 14 is less than the width of the housing so that the locating pins 39 are disposed laterally outward from the panel side walls 124. The panel 14 extends as a cantilever in unsupported relation over the front portion of the housing 12, to define the top of the slot 16, and is rigidly connected to the housing structure over its rear portion. To this end, such top panel 14 is rigidly preassembled to the angle iron side rails 60 which bolt to the side walls 56 of the housing, by means of elongated angle-iron brackets 128 extending from the rear of the housing forward to the rear edge of the slot 16. Such brackets 128 have horizontal legs 127 (FIG. 7) which underlie the top flanges of the angle iron side rails 60 and are welded thereto as at 130, and have vertical legs 129 which lie against the inside faces of the side walls 124 of the top panel and are welded thereto as at 132. When the sub-assembly of the top panel with the angle iron side rails 60 is assembled to the housing, the side rails 60 are bolted to the side walls of the housing and the rear wall 122 of the panel is bolted to the rear wall of the housing as by bolts 126.

Figure 8:
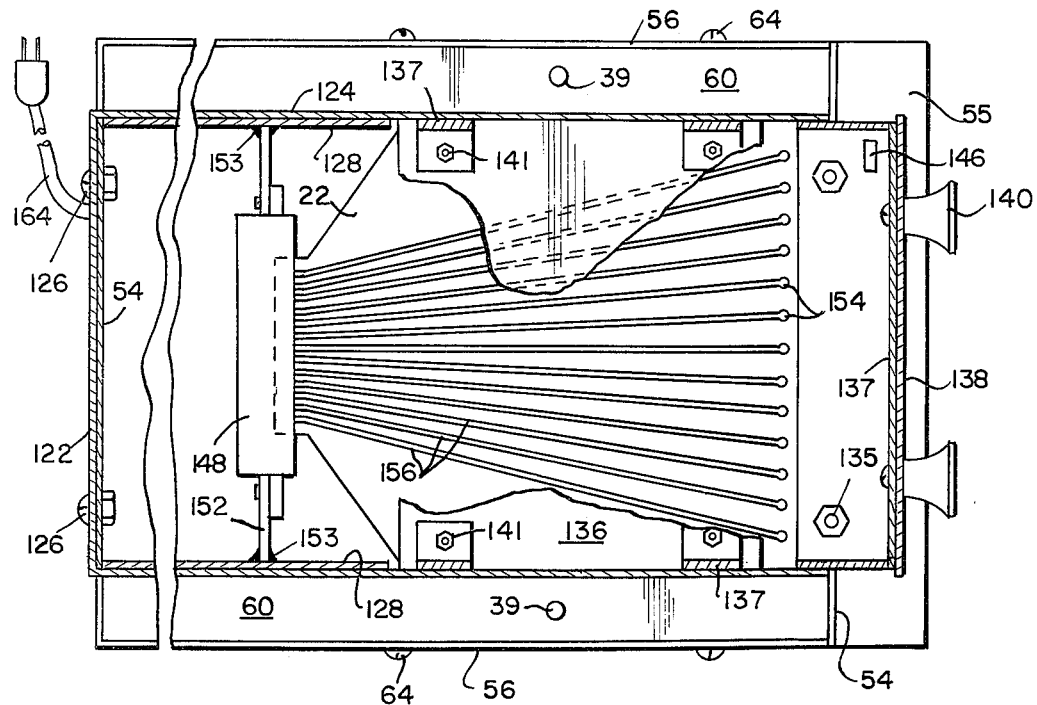
FIG. 8 is a horizontal section on the line 8—8 of FIG. 5 with portions broken away to show the electrically conductive laminate pattern on the upper side of the circuit board.

As shown in FIGS. 1 and 7, the panel side walls 124 have their lower edges turned horizontally inward forward of the brackets 128 to provide lips 134 to support the circuit board 22, and to define the top of the horizontally extending slot 16 between the panel 14 and the housing 12. In practice, the vertical width of said slot is about 1/16 to ¼ inch. The circuit board 22 has a width slightly less than the width of the panel 14, and is slidably received into the forward end of said panel in a track formed by the lips 134 and a horizontally extending backing plate 136. The backing plate 136 is formed from an electrically non-conductive material, and has its lateral edges interconnected to the panel side walls 124 by opposed pairs of brackets 137, as shown in FIGS. 7 and 8. The brackets are connected to the side walls by bolts 139 and to the backing plate by bolts 141. Desirably, said bolts 141 have their heads inset into the plate 136 so that they do not interfere with sliding of the circuit board within the track.

The rear edge of the circuit board narrows in width, as shown in FIGS. 1 and 8, for plug-in reception into a conventional printed circuit board connector 148 having a plurality of lower and upper wiper contacts 149 and 151. The connector is mounted by screws 150 on a transverse metal plate 152 welded by welds 153 to the inside faces of the vertical legs of the brackets 128.

The forward edge of the circuit board is connected by screws 135 to a support bracket 137. The bracket 137 is in turn connected to a vertically extending face plate 138 having a pair of handles 140 mounted thereon. Said plate 138 serves to close the forward face of the upper panel 14 when the circuit board is received therein. This circuit board mounting permits insertion and removal of the board for replacement by a different circuit board having a different gap pattern thereon to be installed in the machine. Conveniently, a key-operated lock cylinder 142 is mounted in the top wall 120 of the panel 14, and has a locking arm 144 which engages a finger 146 mounted on the support bracket 137 to releasably lock the circuit board in the upper sensing panel and to prevent unauthorized access to the answer code defined by the gap pattern.

Alternatively, the circuit board can be bolted in position within the upper panel to prevent easy removal of the circuit board therefrom.

With the circuit board 22 locked in position within the upper sensing panel 14, each set of the contact arms 46 and 50 defining a gap 48 on the laminate pattern 40 is electrically connected through the circuit board connector 148 to one of the lamps 24. As shown in FIGS. 1, 5, and 7, said lamps are mounted in a circular series of sockets 25 in holes formed in the top wall 120 of the sensing panel. Desirably, the lamps are angularly spaced in the same positions and in the same order as the gaps 48 on the laminate pattern 40 of the circuit board to provide correlation between the lighted lamps and the test questions.

The interconnections between the contact arms 50 of the circuit board and the lamps 24 are shown in FIGS. 2, 4, 8, and 9. The contact arms 50 which are nearest the circuit board connector 148 have printed lead connections 51 which run along the underside of the circuit board to the rear edge thereof for connection with the lower wiper contacts 149 in the connector 148. Also, the power lead 44 connected to the central contact disk 42 runs along the underside of the board to the rear edge thereof for connection with one of the lower wiper contacts 149. The contact arms 50 farthest from the connector 148 have lead connections which run away from the central disk 42 to individual terminal points 154. At such terminal points, the leads are connected upward through the board to a series of straight leads 156 on the top thereof which run to the rear edge for connection to the upper wiper contacts 151 in the connector 148. Conveniently, the straight leads 156 are copper laminate leads formed on the upper side of the circuit board in a conventional manner, such as by photographical etching. The terminal points 154 are desirably positioned ahead of the backing plate 136, as shown in FIG. 8, to prevent them from being damaged as the circuit board is inserted into or removed from the sensing panel. A series of wire leads 158 are connected to the contacts 149 and 150 of the circuit board which engage the printed lead connections 51 and 156, and a wire lead 172 is connected to the contact 149 which engages the power lead 44 to the central contact disk 42 on the circuit board.

Figure 9:
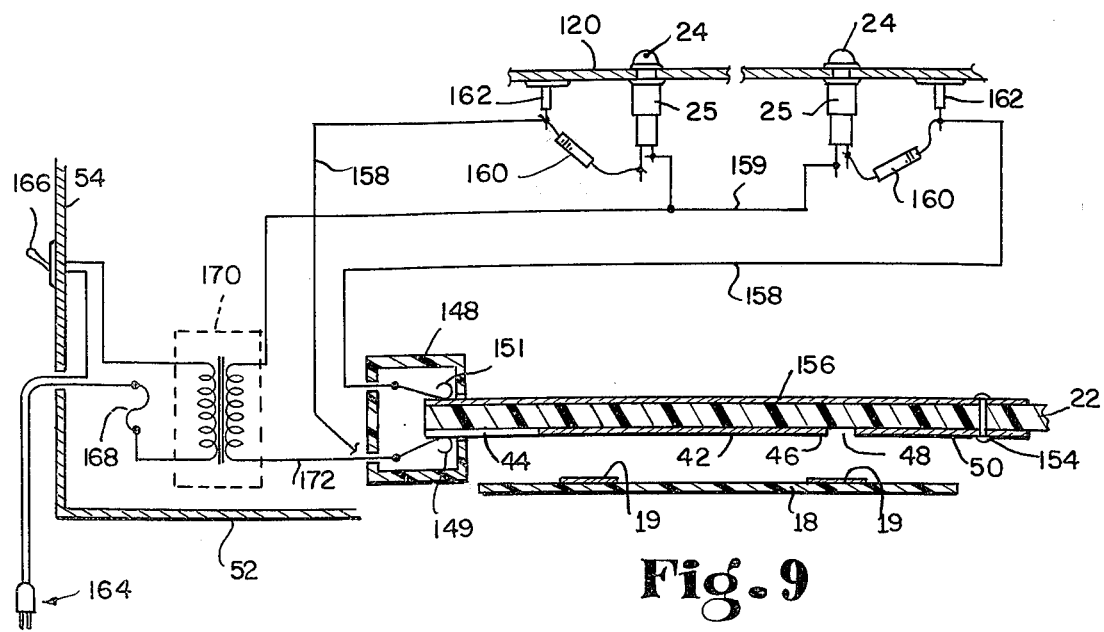
FIG. 9 is a schematic representation of the machine electrical circuit.

The wire leads 158 and 172 are connected in circuits as shown in FIG. 9. Power supply is from a supply cord 164 having a plug for connection to a standard 110 v. AC receptacle. The cord is connected through a control switch 166 mounted on the rear end wall 54 of the housing, and through a fuse 168 to the primary of a one-to-one isolation transformer 170. The secondary of such transformer is connected at one side to the wire lead 172 which connects through the contact connector 148 to the center disk 42 of the laminate pattern and at the other side to a common return lead 159 from the lamp sockets 25. The several wire leads 158 from the connector contacts 149 and 150 are each connected through a resistor 160 to the opposite side of a lamp socket 25. The connections to the resistors are desirably at connection points on terminal strips 162 suspended from the panel top wall 120. The lamp circuits are all alike and parallel, and the two shown in FIG. 9 are representative of the others.

Desirably, the lamps 24 used are high intensity neon lamps, such as that sold under the designation C2A which give long life and high reliability. They require a high resistance in series with them, and it has been found satisfactory to use resistances having a value of 33K ohms.

The circuit provides full voltage across the gaps 48 of the laminate pattern, which helps to ensure that the gaps will be bridged and the circuits closed by pencil lead markings 19 on the answer sheet 18 when the same are pressed against the sensing panel board 22 by the pressure pad 88. I find this more reliable than to use a circuit which reduces the voltage to say 20 volts and uses low voltage lamps, because at such low voltage the pencil markings do not reliably close the circuits across the gaps 48. The isolation transformer isolates the operating circuits from line potential and contributes to safety.

As previously indicated, the lamps 24 are desirably arranged in the same angular spacing and the same order as the electrical gaps 48 to which they are connected. This correlates the lamps with the rows of answer spaces on the answer sheet being graded, and hence with the questions which have been answered. In order to show such correlation, a test question label disk 161 (FIG. 1) is desirably provided for each test, and this is placed within the ring of lamps 24 on the sensing panel in a predetermined orientation correlated with the orientation of the answer sheet being graded. To secure the desired orientation of the label disk 161, it is provided with a non-symmetrical pair of holes which fit over locating posts 163. The label disk 161 may carry a series of numbers to indicate the test questions, but I have found it desirable to divide the disk into subject categories correlated with the questions, so that the number of lamps which are lighted opposite each category indicates to the student his level of performance in that category.

Operation of the test grading machine described above is as follows: The student records his name, the test identification number and other data in the blank spaces at the center of an answer sheet 18, shown in FIG. 2. The test to be answered is assumed to be a numbered series of multiple-choice test questions, each having four lettered answers between which the student is to choose. The student indicates his selected responses to the numbered questions of the test by blacking-in with a soft pencil one of the lettered answer spaces of each correspondingly numbered row of such spaces on the answer sheet 18.

The same answer sheet is also usable for true/false tests. In such use, the student blacks in the two answer spaces marked A and B to register a "true" answer and blacks in the other two answer spaces marked C and D to register a "false" answer.

When the student has completed the test, he takes the answer sheet 18 to the test supervisor who consults the test master code sheet 38 illustrated in FIG. 3 to determine the locations of the code punchings which are to be made to control the orientation of that test answer sheet in the grading machine. The supervisor then punches the appropriate pair of opposed apertures through the peripheral markings 34 on the sheet according to the markings identified by the code sheet. He also selects an answer label disk 16 corresponding to the test being graded.

Either the supervisor or the student then places the answer sheet within the slot 16 of the grading machine between the upper sensing panel 14 and the lower housing 12, and places the label disk 16 on the locating pins 163 within the circle of lamps 24. The sheet 18 is horizontally supported on the pressure pad 88 and on the border surfaces provided by the front lip 55 and the horizontal legs of the side rails 60. The sheet is angularly oriented and located within the slot by engaging its two punched holes (at rows 1 and 13 in FIGS. 1 and 2) over the locating pins 39 at the sides of the housing.

The answer sheet is pressed into contact with the copper laminate gap pattern 40 on the underside of the circuit board 22 by slightly depressing the control lever 20, then pulling the handle 113 of the rod 110 to release the latch 105 holding the crank bar 94, and thus allowing the control lever 20 to rise, which allows the springs 78 to carry the platform 86 upward. Desirably, the upward rate of travel of the platform is controlled by manually restraining the upward movement of the control arm 20. The pressure pad 88 then presses the answer sheet firmly against the laminate pattern 40 on the circuit board so that blacked-in answer spaces 30 corresponding to correct responses are firmly pressed into bridging contact with the gaps 48 in that pattern. Such bridging contacts by correctly located responses marked on the sheet close circuits to the corresponding lamps 24, to light such lamps. In any answer row 32 where an incorrect answer (or no answer) is given, the gap 48 engaged by the unmarked correct answer space will not be bridged, and the lamp circuit containing that gap 48 will not be closed and the lamp will remain dark.

The student can then observe and count the lighted lamps to determine the number of questions on the test which he has correctly answered. Moreover, the student can observe the positions of the lighted and dark lamps in relation to the label disk 161 on the sensing panel to determine how well he performed in particular subject categories of the test. From such observation, the student can then determine whether he should proceed to the next block of instruction or should go back and study material in which he has done poorly.

The answer sheet 18 is released from the machine by pushing the control arm 20 downward until the latch 105 re-engages over the crank bar 94 to again lock the platform 86 is lowered position. The sheet can then be removed from the slot 16 by lifting it off the pins 39 and pulling it out of the slot.

A test and grading apparatus of this invention is particularly useful for students who are following individualized courses of study and are administering "self-tests" at periodic intervals. With this test scoring system, the student can proceed at his own rate and take any particular examination for a block of instruction whenever he feels he is ready. The student can then obtain a quick, easy, and individual read-out of his performance on the particular instruction block by having his answer sheet graded in the grading machine. For this, it is only necessary to punch peripheral apertures in the answer sheet according to the test unit number, insert the answer sheet in the machine in the orientation determined by that punching, and release the control linkage to raise the pressure pad.

The test and scoring apparatus of this invention is particularly advantageous in that the machine can be used to grade answer sheets for several different test units in immediate succession and without adjustment or changing of the built-in answer code determined by the cooper laminate gap pattern. The only change needed is provided by the different orientation punchings on different answer sheets. That is, the gap pattern defines a fixed code or sequence of answers, but the specific starting point within that sequence and thus the specific answer code for a particular examination unit depends upon the angular orientation of its answer sheet within the machine and with respect to the laminate pattern. In the machine shown, there are twenty-five orientations which an answer sheet can have relative to the laminate pattern of gaps 48. The students will not know which orientation will be used on a particular test and hence will not normally be able to determine which spaces represent correct answers. Several examination units can be graded with the same circuit board gap pattern without danger that students will decipher the answer codes for such units. This permits many different examinations to be graded without any adjustment of the machine itself, and therefore greatly simplifies the grading operation, and adapts the machine for grading a random succession of answer sheets for different examination units.

I claim:

1. Test and grading apparatus, comprising:
   an answer sheet having answer indicia thereon defining a circular series of angularly-spaced row of radially-spaced answer spaces representing different answers to questions of a series corresponding to the series of rows, said sheet being adapted to have answers indicated thereon by markings or the like at said answer spaces,
   said sheet also having orientation indicia thereon to define a plurality of orientations in which the sheet may be applied to sensing means for scoring correct answer markings thereon,
   sensing means having a circular series of sensing elements angularly spaced for alignment with said rows of answer spaces and radially spaced for alignment with selected ones of the answer spaces of the rows, to sense correct answers in such spaces,
   orientation means for selectively orienting answer sheets with respect to the sensing means in accordance with designated orientation indicia on the answer sheets,
   means for bringing such answer sheets into sensing relation with the sensing means in the designated orientations for sensing correct answers thereon,
   and indicating means to indicate for observation the results of such sensing.

2. Test and grading apparatus as in claim 1 in which said indicating means comprises a circle of lamps respectively connected to the series of sensing means and arranged in the same circular order, and
   circuit means responsive to the sensing means for lighting the respective lamps in response to sensing of correct answers by the sensing means.

3. Test and grading apparatus as in claim 2 in which said answer spaces are adapted to be marked with electrically-conductive marking material, and said sensing elements comprise electrically-conductive materials defining gaps adapted to be bridged by the conductive material in correct answer spaces, said circuit means comprising parallel circuits respectively connecting the several gaps when bridged to energize the lamps.

4. Test and grading apparatus as in claim 2 with the addition of a label card corresponding to a particular set of test questions which are answered on an answer sheet, means to mount such card in a predetermined orientation relative to said circular series of lamps when that sheet is being sensed, said card having indicia thereon to correlate the lamps with the questions.

5. Test and grading apparatus as in claim 1 in which said answer spaces are adapted to be marked with electrically-conductive marking material, and said sensing elements comprise electrical-conductive material defining gaps adapted to be bridged by the conductive marking material in correct answer spaces, and circuit means responsive to the bridging of said gaps and operative to actuate said indicating means.

6. Test and grading apparatus as in claim 1 in which the answer spaces are adapted to be marked with electrically-conductive marking material, and said sensing means comprises a circuit board having a pattern of conductive laminate material thereon against which the answer sheets are brought into surface contact for sensing, said pattern defining electrical gaps in positions to be bridged by conductive markings in correct answer spaces on the answer sheet.

7. Test and grading apparatus as in claim 6 in which said indicating means comprises a series of electrically-operable individual indicating elements corresponding to the series of row of answer spaces, and electrical circuit means connecting said indicating elements respectively for operation in response to bridging of said laminate gaps.

8. Test and grading apparatus as in claim 6 which includes a pressure plate for pressing answer sheets into surface contact with said circuit board, springs or the like for applying resilient pressure thereto, and manually controlled means for moving the pressure plate toward and away from the circuit board.

9. Test and grading apparatus as in claim 6 which includes a pressure plate for pressing answer sheets into contact with the circuit board, springs or the like constantly urging said plate toward the board, and manually operated control means for retracting the plate from the board.

10. Test and grading apparatus as in claim 9 with the addition of latch means for latching the plate in retracted position.

11. Test and grading apparatus as in claim 1 in which said orientation indicia comprises a circular series of markings defining selective punch locations at which the sheet is to be punched to determine the orientation in which it will be sensed, and said orientation means comprises one or more locating pins or the like positioned in a fixed relation with said sensing means and for engagement in the punchings of answer sheets presented for sensing by said sensing means so as to orient the same for such sensing.

12. Test grading apparatus for grading the answer markings on an answer sheet having a circular series of equi-angularly spaced rows of radially-spaced answer spaces thereon, comprising
 a sensing panel having a circular series of sensing elements arranged in angularly-spaced positions for registry with the angularly-spaced rows of answer spaces and in radially-spaced positions to sense correct answers in selected ones of the answer spaces of the rows,
 said sensing panel thereby defining a circular reference code of correct answer positions and being adapted to sense the set of answers on an answer sheet in any of a plurality of orientations of the answer sheet with respect thereto,
 orientation means for selectively orienting a particular answer sheet and the sensing panel in a particular orientation with respect to each other,
 and means for bringing the answer sheet into sensing relation with the sensing panel in such orientation.

13. Test grading apparatus as in claim 12 in which said sensing elements comprise pairs of electrical contact surfaces defining gaps adapted to be bridged by electrically-conductive markings in the answer spaces on the answer sheet,
 a series of individual, electrically operated indicators corresponding to the series of sensing elements,
 and electrical circuit means connecting each gap in circuit with a different one of said indicators to energize the same when the gap is bridged by a marking on an answer sheet.

14. Test grading apparatus as in claim 13 in which the indicators are lamps.

15. Test grading apparatus as in claim 14 in which the lamps are arranged in a circular series in the same order as the sensing elements.

16. Test grading apparatus as in claim 15 with the addition of means to support a selected label card adjacent said lamps to correlate them with the questions answered on the answer sheet.

17. Test grading apparatus as in claim 12 in which the sensing panel is a circuit board having a pattern of conductive laminate thereon, said sensing elements being electrical gaps formed in said laminate pattern adapted to be bridged by conductive markings on the answer sheet, and said means for bringing the sheet into sensing relation comprises a pressure pad mounted for movement toward the circuit board to press the answer sheet thereagainst.

18. Test grading apparatus as in claim 17 wherein the answer sheet to be graded is provided with a pair of non-symmetrical spaced punchings in orientation locations selected to match the test being answered, and said orientation means comprises a pair of locating pins or the like positioned in fixed relation to said circuit board and for engagement by said punchings.

19. A test grading machine for grading answer sheets having a circular pattern of indicia thereon defining a circular series of equi-angularly spaced rows of radially spaced answer spaces, comprising
 a housing having a sensing panel mounted thereon, said housing and panel defining a slot therebetween for receiving an answer sheet in any of a plurality of angular orientations therein,
 a sensing board mounted in said panel and facing said slot, said board having a circular pattern of sensing elements thereon corresponding to a pattern of correct answer markings on an answer sheet, said pattern of sensing elements being engageable by answer sheet in any of a plurality of angular orientations so as to provide different angular positions of the correct answer pattern on differently oriented answer sheets,
 a platform movably mounted in the housing, facing said circuit board and on the opposite side of the slot from such board,
 positioning means for locating and orienting an answer sheet in said slot in a selected one of a plurality of angular orientations with respect to the sensing board and platform,
 means for moving the platform toward the sensing board to carry an oriented answer sheet into sensing contact with the sensing elements thereon,
 and indicating means responsive to said sensing elements for indicating correct answers on an answer sheet.

20. A test grading machine as in claim 19 in which said positioning means comprises a pair of locating pins mounted in positions for engagement in punched openings in an answer sheet inserted in said slot, so as to hold such answer sheet in a particular location and orientation therein with respect to the platform and sensing board.

21. A test grading machine as in claim 19 in which said sensing board comprises a pattern of electrically-conductive laminate on said circuit board and said sensing elements are electrical gaps formed in said laminate pattern and adapted to be bridged by electrical marking material in answer spaces on the answer sheet to complete electrical circuits thereacross.

22. A test grading machine as in claim 21 wherein said indicating means comprises a series of lamps mounted on said sensing panel, corresponding in number to the number of sensing gaps in said laminate pattern, and circuit means connecting each of said lamps with one of said gaps and operative to light the lamp when the gap is bridged.

23. A test grading machine as in claim 22 which said series of lamps are mounted in a circle on said sensing panel in substantial registry with the pattern of gaps on the sensing board, the lamps being generally in the same order and position as the gaps.

24. A test grading machine as in claim 19 in which said panel comprises a guideway and the sensing board is removably mounted in said guideway for ready replacement by another board having a different pattern of sensing means thereon.

25. A test grading machine as in claim 19 in which said platform moving means comprises one or more springs or the like mounted between the platform and housing and constantly urging the platform toward the sensing board, a manually-operable control arm interconnected to said platform for retracting the platform from the sensing board and a latch to retain the platform in retracted position.

26. A test grading machine for grading answer sheets having a circular pattern of indicia thereon defining a circular series of equi-angularly spaced rows of radially-spaced answer spaces, and on which answers are to be indicated by marking selected ones of the spaces with electrically-conductive material, comprising a base housing and a sensing panel mounted as a cantilever over the housing to define a horizontal slot for receiving an answer sheet to be graded, a sensing board mounted in said panel and facing the slot, said board having electrical contacts thereon defining a circular pattern of electrical gaps thereon corresponding to a pattern of correct answer markings on an answer sheet, said gap pattern being engageable by answer sheets in any of a plurality of angular orientations so as to provide different angular positions of the correct answer pattern on the differently oriented sheets, a platform movably mounted in the housing below the slot and movable upward to carry an answer sheet thereon into contact with the gap pattern on the sensing board, locating pins mounted laterally beside the sensing panel and projecting upward from the housing, in position for engagement in punched openings or the like in an answer sheet so as to hold the same in a particular orientation relative to the sensing board, means for lifting the platform toward the sensing board and resiliently pressing an oriented answer sheet into sensing contact with the gap on the board, manually operable arm connected for controlling the position of the platform, and a circle of lamps mounted on the sensing panel above the sensing board, and circuit means connecting said lamps in parallel with the respective gaps on the sensing board and operative to light each lamp when its connected gap is bridged by a correct answer marking on an answer sheet.

* * * * *